Feb. 6, 1934.  R. L. DRAKE ET AL  1,946,438
HANDLE TESTING MACHINE
Filed June 28, 1929   5 Sheets-Sheet 5
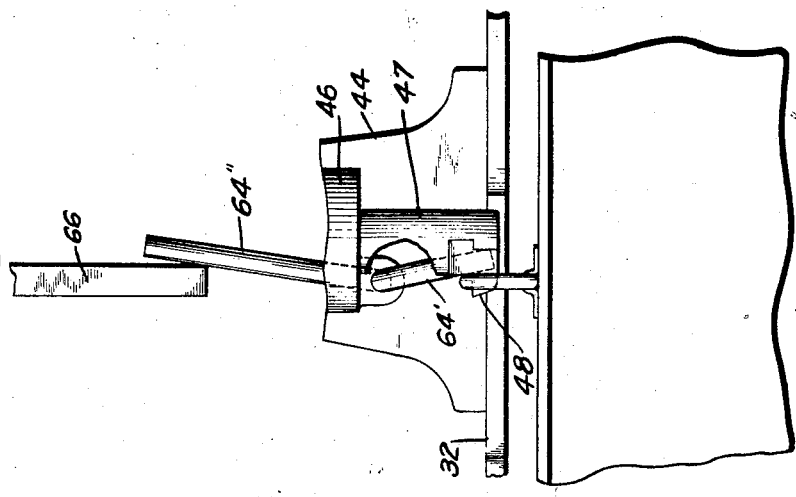
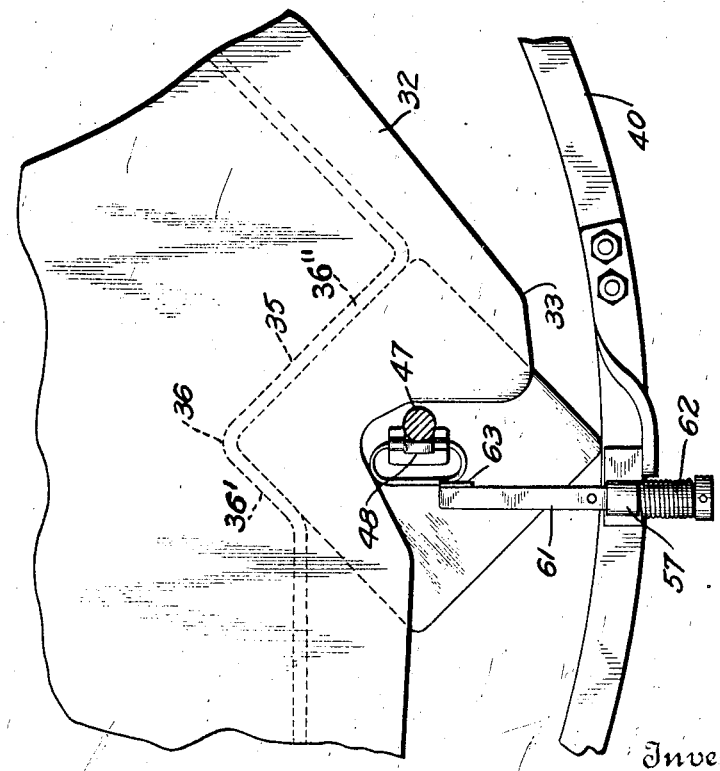
Inventors
Rollin L. Drake
Leon D. Titus
R. J. Dearborn
By their Attorney Patented Feb. 6, 1934

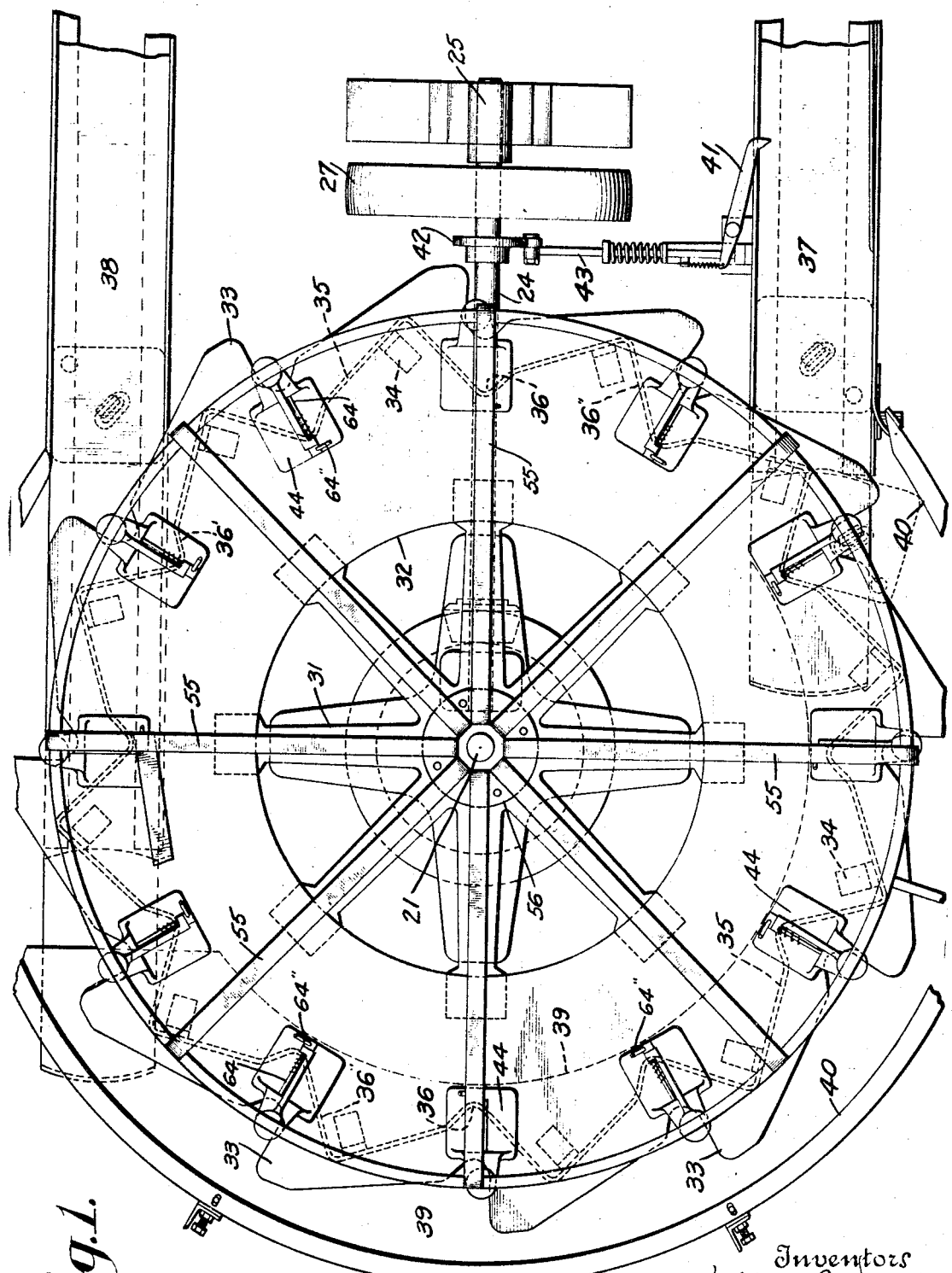

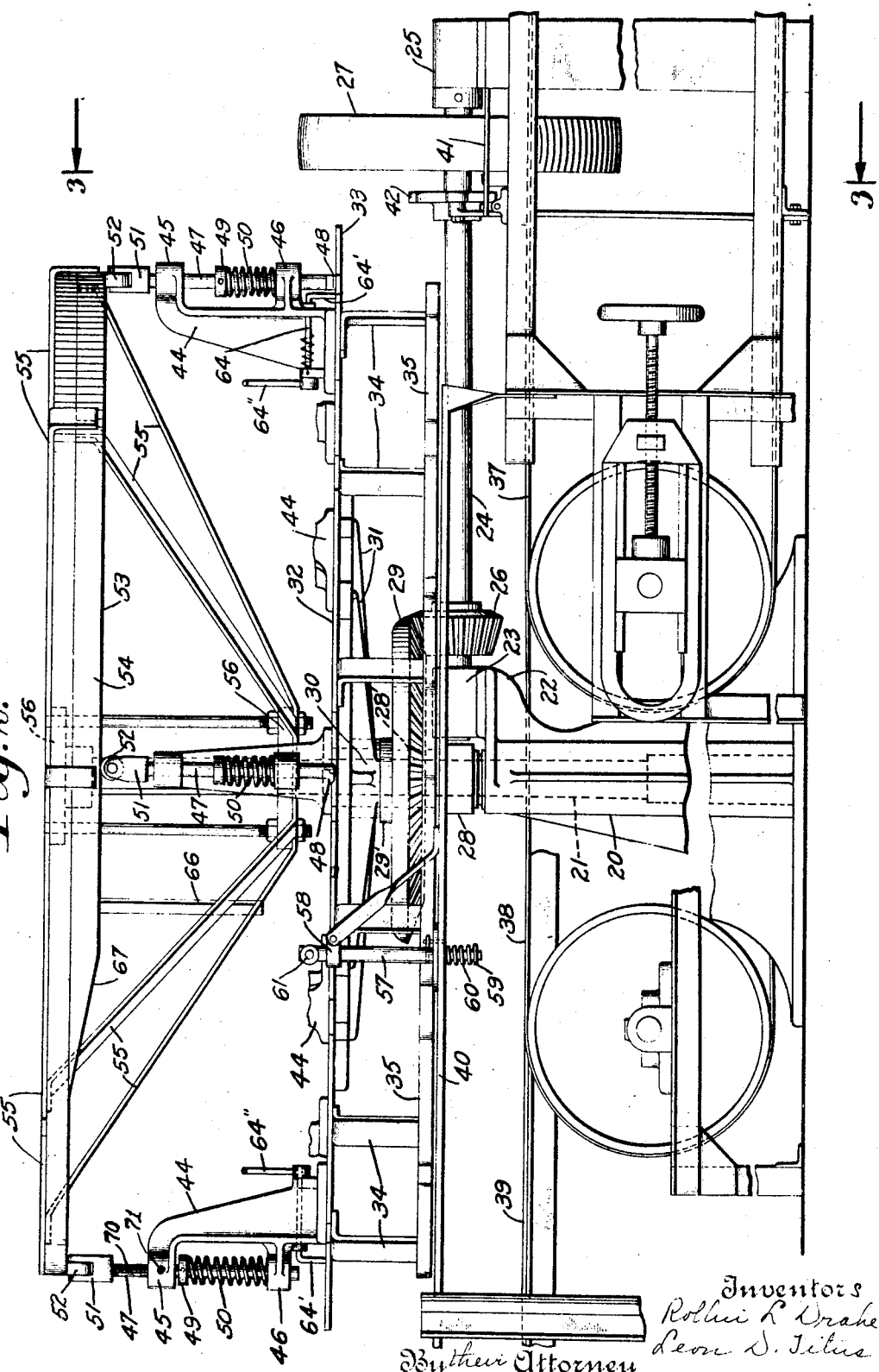

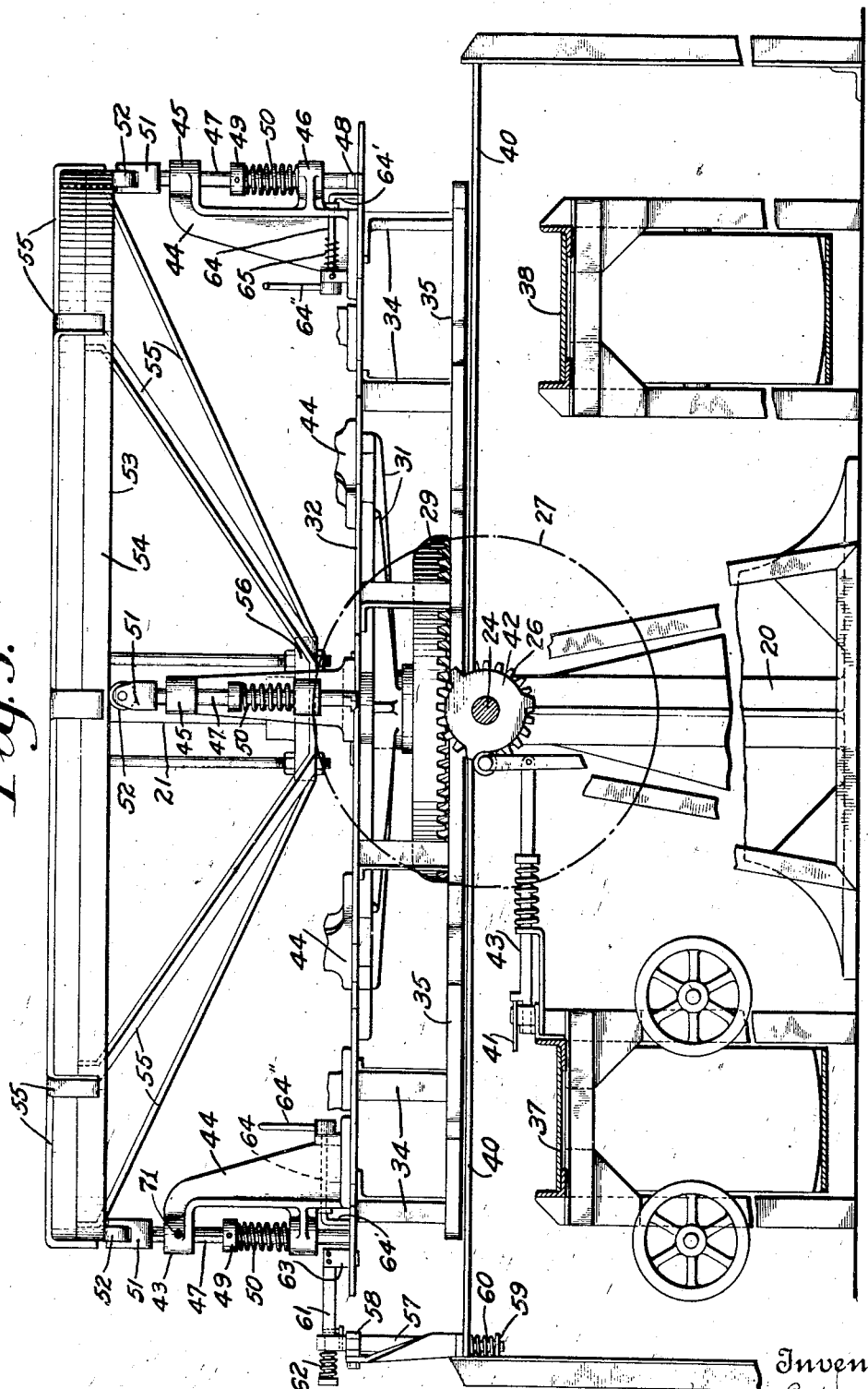

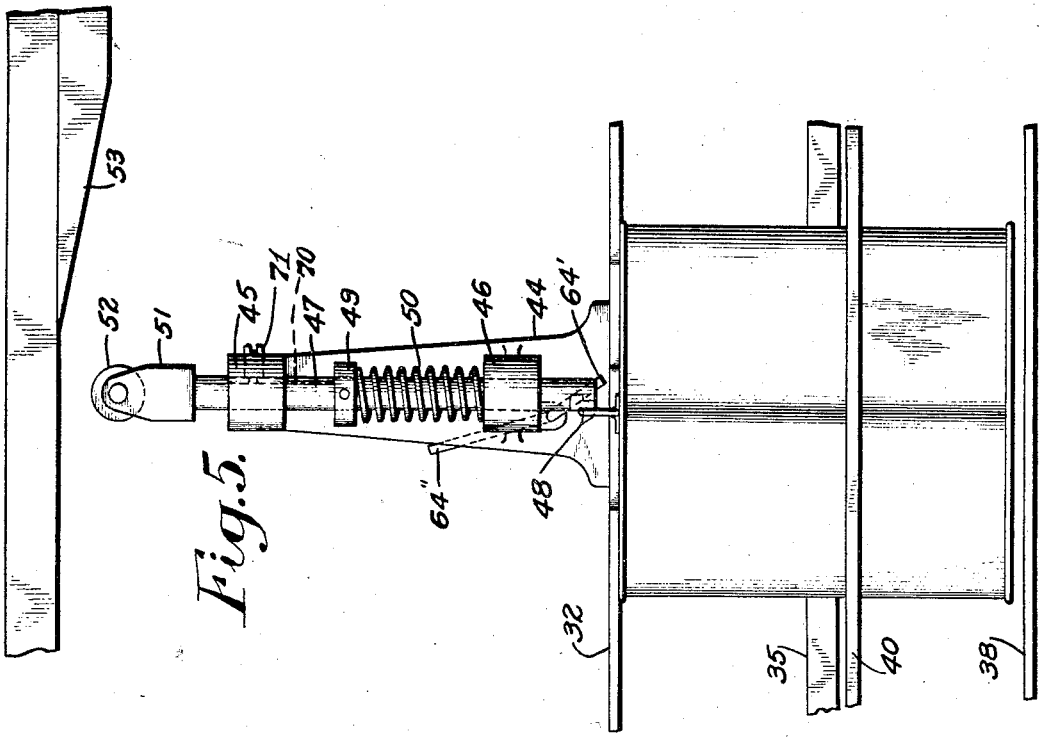
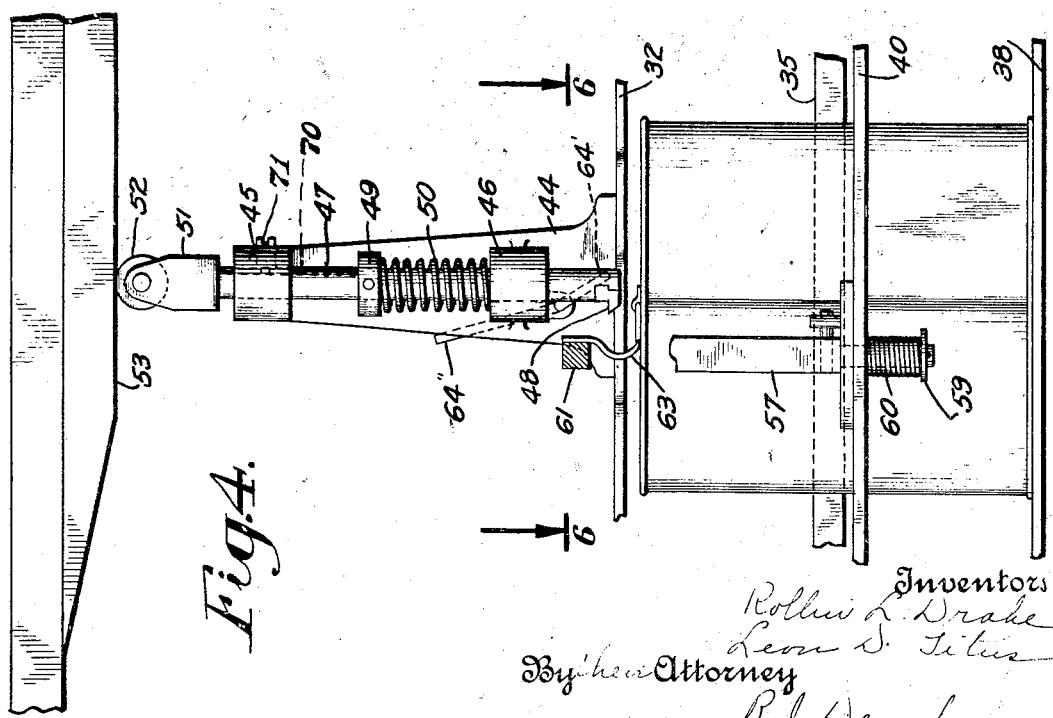

1,946,438

UNITED STATES PATENT OFFICE 1,946,438

HANDLE TESTING MACHINE

Rollin L. Drake and Leon D. Titus, Port Arthur, Tex., assignors to The Texas Company, New York, N. Y., a corporation of Delaware Application June 28, 1929. Serial No. 374,464

16 Claims. (Cl. 73—51)

Our invention relates to handle testing machines and particularly to machines for testing the strength of the joint between a container and the handle by which it is carried.

Liquid containers, particularly those of the larger sizes, such, for example, as oil or kerosene cans, are ordinarily provided with suitable handles by means of which the containers may be picked up and carried. One practice is to secure the handles to the containers after the bodies have been completed and where this practice is followed the handles are generally soldered in place. It sometimes happens that the solder joint between the handle and the can body is not perfect and upon being filled with liquid, the weight of the container will be greater than the handle will stand with the result that the handle will pull apart from the container. This, of course, necessitates a resoldering job. It is therefore desirable to subject all soldered handles to a test before the containers are filled so that the weak joints may be discovered and the defects remedied before the containers are put into use.

It is one of the objects of this invention to provide a machine for automatically testing handles which have been soldered or otherwise secured to containers to ascertain whether or not the joints between the handles and the containers are sufficiently strong to stand up in actual service.

Another object of the invention is to provide means for automatically subjecting handles soldered to containers to a predetermined stress or pulling force, which stress or pulling force exceeds the maximum to which the handles are likely to be subjected in service.

Still another object of the invention is to provide means for automatically positioning cans as they are fed to the machine so that each can will be properly placed with respect to one of the handle testing units, and for actuating the cans before and after the period of the test.

The invention also contemplates and includes the provision of means for automatically moving the handle of each can into operative engagement with one of the testing units, and means for severing that engagement at the conclusion of the test.

A further object of the invention is to provide means for actuating the handle testing units in timely succession and for predetermined periods.

These and other objects, features and advantages of the invention will more readily appear as the description of the invention contained in the following pages, when taken in connection with the accompanying drawings, proceeds.

In the drawings:

Fig. 1 is a plan view of a testing machine embodying the present invention.

Fig. 2 is a view in side elevation of the same machine illustrated in Fig. 1.

Fig. 3 is a view in end elevation of the machine illustrated in Figs. 1 and 2.

Fig. 4 is an enlarged detail view illustrating the handle positioning and testing means before the testing means engages the handle.

Fig. 5 is an enlarged detail view illustrating the testing means in operative engagement with the handle.

Fig. 6 is an enlarged view taken on the line 6—6 of Fig. 4, and

Fig. 7 is an enlarged detail view illustrating the arrangement employed to break the engagement between the handle and the testing mechanism at the conclusion of the test.

By reference to Figures 2 and 3 of the drawings it will be seen that in the embodiment of the invention illustrated, the apparatus includes a hollow pedestal 20 which constitutes a base or supporting element for a vertically disposed stationary shaft 21, which extends upwardly beyond the upper end of the pedestal. The pedestal is formed with an off-set portion 22 to which is secured a bearing member 23 in which an end of a pinion shaft 24 is journaled. The opposite or outer end of shaft 24 is journled in a similar bearing member 25. A pinion 26 is mounted on the inner end of shaft 24 and a drive or band wheel 27, through which power is applied for operating the machine, is secured near the outer end of the shaft.

A bearing sleeve 28 is disposed on shaft 21 above the upper end of the pedestal 20 and the adjacent faces of the sleeve and pedestal are machined and grooved to accommodate ball bearings (not shown) in order that the sleeve may be free to rotate. The sleeve is formed with a section 28' of reduced diameter and on this section there is keyed a bevel gear 29 formed with a hub 29'. Gear 29 engages or meshes with pinion 26, and above gear 29 is a collar 30 which is likewise keyed to section 28' of sleeve 28. This collar is formed with a number of radial arms 31, the outer ends of which support a rotary element in the form of a substantially annular plate 32.

The outer periphery of the rotary element or plate 32 is irregular in contour and, as clearly shown in Figure 1, is formed with a series of spaced projections 33. Depending from plate 32 are a number of straps or hangers 34 which have secured to their lower ends a can positioning and actuating member 35 which in the present case consists of an elongated piece of strap metal so formed as to provide a series of angular notches or recesses 36. Each recess has a can positioning face 36' and a can actuating face 36" and is shaped so as to hold a square can with two of its opposite corners in line with a radius of a circle having shaft 21 as its center, as shown in Figure 6.

Cans are fed to the machine by means of a belt conveyer 37 and are carried away after the test on a similar belt conveyor 38. Cooperating with the ends of the two conveyors is a semi-circular plate or runway 39 around which the cans to be tested are forced to move by reason of the action of actuating member 35. A stationary guide 40 serves as an outside guard and prevents the cans from changing their position after entering the machine.

In order that cans may be fed to the testing machine at regular intervals a can spacer is provided, and in the example illustrated this spacer comprises a pivoted arm 41 adapted, in the position shown in Figure 1, to engage the on-coming cans on conveyer 37 and to hold up the line until arm 41 is moved to a non-engaging position. The operation of arm 41 is controlled by the movement of a cam 42 on shaft 24 through a spring pressed rod 43 so that at regular intervals arm 41 is moved momentarily to permit a single can to pass to the machine.

A can, having passed the spacer at a predetermined point in the cycle of operation, moves forward on conveyer 37 and comes in contact with member 35 which moves in a clockwise direction as viewed in Figure 1. The actuating section 36" engages the can and moves it forward between it and the stationary guide 40 so that the can is compelled to take its position in one of the recesses 36 in the manner already mentioned, and the can so positioned travels around the runway 39 until picked up by the testing machine, as will now be described.

The machine is provided with a plurality of separate handle testers so that a number of handles can be tested at one time and in a continuous manner. The testers are mounted at spaced intervals on plate 32 and are all alike so that it will be necessary to describe only one in detail.

Each tester comprises a frame or bracket 44 formed with aligned upper and lower bearing members 45 and 46. A vertically movable rod 47 which is formed or provided at its lower end with a hook 48 is mounted in the bearing members 45 and 46. A collar 49 is secured on the rod at a point intermediate its ends and between the bearing members. A coil spring 50 is disposed around that portion of the rod between collar 49 and the lower bearing member 46, the position of the collar being such that the spring is always maintained under compression. A yoke 51 is secured to the upper end of rod 47 and a roller 52 is pivotally mounted between the arms of the yoke. As shown best in Figures 4 and 5, rod 47 is formed with a longitudinally disposed keyway 70 and a key or screw 71 extends through bearing member 45 and into the keyway to keep the rod from turning.

The roller 52 of each tester is adapted to contact with an annular cam surface 53 which is so formed that as the plate 32 rotates the rod 47 is either free to be moved upwardly by spring 50 or is forced downwardly against the pressure exerted by the spring. The cam surface 53 is formed on the under side of an annular ring 54 which is maintained in position by means of suitable rods or braces 55 which are in turn secured to suitable collars 56 or the like mounted on the upper end of shaft 21.

As the cans to be tested come to the testing machine the handles lie flat on the tops of the cans and face in a forward direction, and in order that they may be subjected to the test it is necessary to provide means for lifting them into a vertical position so that they may be engaged by hooks 48. This means consists of a vertically disposed rod 57 rotatably mounted in spaced bearing members 58 and 59. The rod is yieldingly maintained in position by a spring 60 which is secured at one end to the rod 57 and at the other end to the lower bearing member 59. A bearing is formed in the upper end of rod 57 and a horizontally disposed rod 61 which is round throughout a portion of its length and square throughout another portion is rotatably mounted therein and maintained in a yielding position by a spring 62. A finger 63 is secured to and depends from the inner end of rod 61 and in the position in which it is normally maintained by spring 62, the finger is slightly inclined in the direction of the handle which it is to lift into engagement with hook 48.

As a can, actuated by member 35, approaches the handle positioning means, finger 63 slips under the handle. As the can continues to move, the handle rides up the face of the finger until it is finally thrust into position on one of the hooks 48. Then the continued movement of the can tends to push the finger 63 out of the way and in so doing, rod 61 rotates against the pressure of spring 62, and rod 57 rotates against the pressure of spring 60. Thus the finger 63 is moved upwardly and outwardly to permit the can to pass, after which springs 60 and 62 operate to force rods 57 and 61 back to their normal operative positions.

After the test has been completed it is necessary to remove the handle from hook 48 so that the can will be free to be discharged to the conveyor 38. The handle releasing mechanism consists of a rotatable rod 64 mounted in bearings in bracket 44. One end 64' of the rod is bent at a right angle to the central portion and normally extends in a downward direction. The other end 64" of the rod is also bent at a right angle to the central portion and normally extends in an upward direction. The rod is normally maintained in the position just described by means of a spring 65 which is suitably secured in operative position. The downwardly extending end 64' is disposed adjacent and parallel to the lower end of rod 47. At the proper point in the cycle of operation of the machine and after the handle has been tested, the upwardly extending end 64" contacts with a fixed arm 66 which is secured to and depends from ring 54 so that the whole rod 64 is turned against the tension of spring 65. End 64" is forced backward and end 64' is forced forward and in moving forward end 64' contacts with the handle of the can with sufficient force to dislodge it from its position on hook 48.

Having described the various parts of the machine I will now describe its operation and will point out the manner in which the several parts co-operate. As the operation is identical with each can tested the course of a single can only will be described.

Cans are continuously fed to the machine on conveyor 37 and one by one they come in contact with arm 41 of the spacing mechanism. The line of cans is momentarily held up until arm 41 is withdrawn by reason of the movement of rod 43 as actuated by cam 42. A single can passes the arm which then returns to its original position to hold up the following cans.

The single can which has now been released again moves forward on conveyor 37 toward actuating member 35, its movement being so timed that as it reaches a predetermined point in its advance it is engaged by the actuating section 36″ of member 35 which pushes the can on to plate 39 in the position shown in dotted lines in Figure 1, directly beneath one of the handle testers. The can is maintained in this position by reason of its loose fit between sections 36′ and 36″ of member 35 and the stationary guide 40.

At this point in the cycle of operation, rod 47 is depressed to the full extent and the hook 48 is ready to receive the handle of the can. The handle is moved into engagement with the hook 48 by the action of the finger 63 which slips under the handle and raises it into position on the hook. The can, as well as the tester, is continuously moving and as soon as the handle has been placed upon the hook the rods 61 and 57 both rotate against the tension of the springs 62 and 60 so that the finger 63 may swing out of the way of the advancing can and its handle. As soon as the can has passed, the tension of springs 62 and 60 moves rods 61 and 57 back to their operative position ready to act upon the next handle.

The can, with its handle engaged by hook 48, continues to advance and as roll 52 travels around cam surface 53 it rides up an inclined section 67 which allows spring 53 to expand and force rod 47 upwardly. Inasmuch as the handle of the can is suspended on hook 48, the can is raised from plate 39 and its upper end is drawn up against the lower face of one of the projections 33 of plate 32. Thus the can is held in a fixed position with respect to plate 32 while spring 50 exerts the continuous upward thrust on rod 47. The can handle is subjected to a pull or stress such as it would experience when filled and lifted by hand, and by a proper selection of springs any desired pull or stress can be imposed upon the handles. Of course, if the handle is not secured strongly to the can top it will part therefrom when this pull or stress is imposed upon it. Under such circumstances the can drops back upon plate 39 and is pushed around by member 35 until delivered to conveyor 38 from which defective cans are removed by the operator in charge.

Plate 32, with the can firmly held against the lower face of one of the projections 33 continues to rotate until roll 52 reaches a downwardly inclined section of cam surface 53, at which time rod 47 is forced downwardly against the pressure exerted by spring 50. The can again assumes a position of rest on plate 39 and the engagement between the can handle and hook 48 is such that when the vertically disposed section 64′ of rod 64 contacts with arm 66, the downwardly projecting section 64′ is actuated to thrust the handle out of engagement with hook 48. The can continues to advance until it is finally pushed on to conveyer 38 which carries the can away from the machine.

Each can in turn as it comes from conveyor 37 is similarly picked up by one of the sections of the actuating member 35 and goes through the same movements before it is discharged to conveyor 37. The machine is capable of handling and testing a number of cans at one time and the operation is a continuous one which is repeated as long as cans are fed to the machine.

A handle testing machine of preferred form and construction has been illustrated and described for the purpose of showing a way in which this invention may be practiced, but the inventive thought upon which this application is based is broader than this illustrative embodiment hereof. It is therefore understood that the scope of the invention is not to be limited by the present disclosure, reference being had to the appended claims for that purpose.

What we claim is:

1. In a handle testing machine, a testing unit adapted to engage the handle of a can, means for moving said testing unit vertically at periodic intervals and for predetermined periods to impose a stress on the handle, and means for holding the body of the can against vertical movement while the stress is imposed upon the can handle.

2. Apparatus for testing can handles comprising means for engaging the handle of the can and means for moving said engaging means in a direction away from the can to impose a predetermined stress on the handle, and means for holding the body of the can stationary while the stress is imposed upon the handle.

3. In a handle testing machine, a plurality of testing units each adapted to be engaged by a handle to be tested and means for moving the testing units vertically in timely succession and for predetermined periods to impose a pull upon each of the handles.

4. Apparatus for testing can handles comprising a vertically movable rod, a hook on the lower end of said rod adapted to engage the handle of a can, resilient means for actuating said rod upwardly to impose a stress on the handle, and means for controlling the action of said resilient means to limit the duration of the stress imposed upon the handle.

5. Apparatus for testing can handles comprising means for engaging the handle of a can, means for moving said engaging means in a direction away from the can to impose a predetermined stress on the handle, means for controlling the duration of the stress so imposed, and means for holding the can against movement during the imposition of the stress on the handle.

6. Apparatus for testing can handles comprising means for supporting a can in a predetermined position, means for engaging a handle on the end of the can, means for automatically moving the handle into position on the engaging means, and means for moving the engaging means in a direction parallel to the axis of the can to impose a predetermined stress or pull on the handle.

7. Apparatus for testing can handles comprising means for engaging the handle of a can, means for actuating the engaging means in a direction away from the can to impose a predetermined stress on the handle, and means for automatically releasing the handle from the engaging means at the conclusion of the test.

8. In an apparatus for testing can handles, a support, a bracket mounted on said support and formed with upper and lower bearing members, a vertically movable rod mounted in said bearings, a hook on the lower end of said rod adapted to engage the handle of a can, a collar secured on said rod intermediate the bearing members, a compression spring disposed between said collar and the lower bearing member, and means for periodically depressing said rod against the action of said spring to engage the handle to be tested and then releasing the rod so that the spring may again become effective to lift the can by the handle.

9. Apparatus for testing can handles comprising a rotary element, a stationary platform beneath said rotary element, means for delivering cans to said platform, a can positioning and actuating member secured to said rotary element and adapted to rotate therewith, a plurality of handle testing units mounted on said rotary element, each testing unit being adapted to be engaged with a handle of one of the cans, means for actuating the testing units in succession and for predetermined periods, and means for removing the cans from the machine at the conclusion of the test.

10. Apparatus for testing can handles comprising a rotary element, a plurality of testing units mounted on said rotary element, means for positioning a can beneath each of the testing units and for moving the cans so positioned in unison with the testing units, means for conveying a succession of cans to said positioning means, means for actuating the handle of each successive can into engagement with one of the testing units, means for actuating the testing units to impose a predetermined stress on the handles engaged therewith, means for severing the engagement between the handles and the testing units at a given point in the cycle of operation and means for conveying the cans from the apparatus.

11. Apparatus for testing can handles comprising a rotary element, a plurality of handle testing units mounted on said rotary element, each testing unit being adapted to engage a handle of a can, means for positioning a can beneath each of the testing units and for moving the cans so positioned in unison with the testing units, means responsive to the movement of the rotary element for actuating the testing units, and means for actuating the rotary element to operate the handle testing units.

12. In apparatus for testing can handles, a rotary element, means for supporting a series of cans beneath said rotary element, means mounted on said rotary element for engaging the handles on the cans and for raising the cans into contact with the rotary element to effect a continued pull on said handles while the cans are held in contact with the rotary element to test the strength of the joint between the handles and the cans.

13. Apparatus for testing can handles comprising a support, a bracket mounted on said support and formed with upper and lower bearing members, a collar secured on said rod intermediate the bearing members, a compression spring disposed between said collar and the lower bearing member and adapted to normally urge the rod upwardly, means for actuating said rod to periodically depress it against the action of said spring to engage the handle to be tested and then to release the rod so that the rod may again move upwardly to lift the can to test the strength of the joint between the handle and the can.

14. In apparatus for testing can handles, a vertically movable rod having a hook at the lower end thereof, means for actuating the handle of a can into operative engagement with said hook, resilient means for imparting an upwardly directed force to the rod while the hook is in engagement with the can handle to impose a pulling force on the handle, means for arresting the upward movement of the can while the pulling force is being applied to the handle, and means for actuating the handle positioning means.

15. In combination with handle testing apparatus, a vertically movable rod having a hook at the lower end thereof for engaging the handle of a can, means for lifting the handle of a can into engagement with the hook, means for subsequently disengaging the handle from the hook, and means for actuating said handle engaging and disengaging means.

16. In apparatus for testing can handles, a rotary element, a plurality of handle testing units mounted on said rotary element, each testing unit comprising a vertically movable rod, means on the lower end of said rod for engaging the handle of a can, resilient means for imparting an upwardly directed force to the rod when a can handle is engaged therewith, means effective at predetermined intervals for periodically depressing said rod for engagement and disengagement of its engaging means with the handle of a can, means for actuating a can handle into engagement with the engaging means, means for arresting the upward movement of the can while the upward force is being applied to the rod to impose a stress on the joint between the handle and the can, and means for operating the rotary element to render the rod depressing means effective at the predetermined intervals.

ROLLIN L. DRAKE.
LEON D. TITUS.